United States Patent [19]

Holsinger et al.

[11] Patent Number: 4,660,213

[45] Date of Patent: Apr. 21, 1987

[54] SIGNAL STRUCTURE FOR DATA COMMUNICATION

[75] Inventors: Jerry L. Holsinger, West Boxford; Charamporn Jotikasthira, North Andover; Kaveh Pahlavan, Newton, all of Mass.

[73] Assignee: Infinet, Inc., North Andover, Mass.

[21] Appl. No.: 554,261

[22] Filed: Nov. 22, 1983

[51] Int. Cl.[4] .................... H04L 27/02; H04L 27/18
[52] U.S. Cl. .................................. 375/39; 329/104; 332/9 R; 375/42; 375/58
[58] Field of Search ............... 371/2; 370/20; 375/39, 375/42, 53, 58, 25, 27; 329/50, 122, 104, 105; 332/9 R, 10, 17; 178/113; 340/347 DD

[56] References Cited

U.S. PATENT DOCUMENTS

| | | | |
|---|---|---|---|
| 3,887,768 | 6/1975 | Forney, Jr. et al. | 375/39 |
| 3,955,141 | 5/1976 | Lyon et al. | 375/39 |
| 3,988,539 | 10/1976 | Motley et al. | 375/39 |
| 4,271,527 | 6/1981 | Armstrong | 375/39 |
| 4,347,616 | 8/1982 | Murakami | 375/42 |
| 4,439,863 | 3/1984 | Bellamy | 375/18 |
| 4,562,425 | 12/1985 | Turner et al. | 375/27 |

OTHER PUBLICATIONS

IEEE Transactions on Communications pp. 1238–1239, Com 25, No. 10, Oct. 1977; "On Improving Bit Error Probability of QPSK and 4-Level Amplitude Modulation Systems by Convolutional Coding.

Lucky, Robert Wendell; Digital Phase and Amplitude Modulated Communications Systems; Purdue University, Aug. 1961.

Proakes, "Modulation and Demodulation for the Additive Gaussian Noise Channel", Digital Communications, 1983, pp. 182–190.

VanGerwen et al, "Microprocessor Implementation of High-Speed Data Modems", IEEE Transactions on Communications, vol. COM-25, No. 2, Feb. 1977, pp. 238–250.

Koya et al, "High Speed Data Modem Using Digital Signal Processor", IEEE, International Communications Conference, 1981, pp. 14.7.1–14.7.5.

Schwartz, Information Transmission Modulation and Noise, (3d ed. 1980) pp. 226–235.

"Heuristic Solution of a Signal Design Optimization Problem" by B. W. Kernighan and S. Lin, pp. 1144–1159, The Bell System Technical Journal, Sep. 1973, vol. 52, No. 7.

"On the Selection of a Two-Dimensional Signal Constellation in the Presence of Phase Jitter and Gaussian Noise", by G. J. Foschini, R. D. Gitlin and S. B. Weinstein, pp. 927–965, The Bell System Technical Journal, vol. 52, No. 6–Jul.–Aug., 1973.

"Optimization of Two-Dimensional Signal Constellations in the Presence of Gaussian Noise", by Gerard J. Foschini, Richard D. Gitlin, member IEEE, and Stephen B. Weinstein, member, IEEE, pp. 28–38, IEEE Transactions on Communications, Jan. 1974.

Primary Examiner—Benedict V. Safourek
Attorney, Agent, or Firm—Lahive & Cockfield

[57] ABSTRACT

A signal structure for high speed data communication selects each signal point in the structure to attain a low probability of error in the presence of both additive noise and multiplicative noise. Transmission apparatus for practice of the invention employs an encoder which responds to digital data to produce a QAM signal having parameters selected according to the new signal structure, and receiving apparatus employs a decoder which converts a received QAM signal to digital values according to the same structure.

11 Claims, 7 Drawing Figures

SIGNAL STRUCTURE FOR DATA COMMUNICATION

BACKGROUND OF THE INVENTION

This invention relates to the transmission of digital data in analog form at high speed with a low rate of error due to transmission impairments, including electrical noise.

More particularly the invention provides new signal structures characterized by relatively high immunity to error due to multiplicative noise, as well as additive noise and phase jitter.

Digital data conventionally is transmitted, as on telephone lines, by sending a carrier signal with analog modulation coded to convey, in every time interval, a set of binary digits. A conventional practice sends M bits once per transmission interval, i.e., baud interval, where M is an integer. The M bits have $2^M$ possible values. Hence the coded analog signal in this practice identifies one of the $2^M$ possible values once per baud interval. For example, to send 2,400 bits per second (bps) in each time interval, a single bit is transmitted by coding the analog signal to send one of two values, i.e., $M=1$ and $2^M=2$. Examples of conventional higher speed transmission rates are 9,600 bps wherein four bits are transmitted in each interval by sending one of sixteen analog values; and 14,400 bps, wherein six bits are transmitted in each interval by sending one of sixty-four analog values. Conventional baud rates include 1200; 1600; and 2400 symbols per second.

One conventional coded analog signal used for this data transmission uses double sideband-quadrature carrier modulation (DSB-QC). This modulation technique involves two carrier signals 90° apart in phase, i.e., a quadrature relation, and each having double sideband modulation.

The coding of the modulation, in particular the selective amplitude and phase of the modulation, is defined by two analog parameters designated $a_i$ and $b_i$ where (i) is an integer. The values of these modulation parameters identify, in each interval, the one analog value being transmitted. Thus, in a 9,600 bps transmission system, there are sixteen possible sets of the two analog parameters to identify one of the sixteen possible analog values being sent. Similarly in a 14,400 bps transmission system, there are sixty-four possible sets of the two analog parameters.

The values of the modulation parameters are conventionally plotted as points in a two-coordinate complex plane. The set of points for a transmission system is termed a "signal structure", or "signal space," or "signal constellation".

The occurrence of electrical noise and other transmission impairments makes it difficult, however, to determine the value of the modulation parameters at the receiver end of a data transmission system. The probability of error due to this difficulty in value determination increases with the speed of data transmission. This is because higher transmission speeds involve a greater number of possible values, and it is increasingly difficult to distinguish between them in the presence of electrical impairments.

It is known to select a signal structure to reduce error rates and otherwise to enhance data transmission. U.S. Pat. Nos. 3,887,768 and 4,271,527 disclose two designs for signal structures. These and other known signal structures are nevertheless subject to significant error rates in the presence of certain forms of transmission impairments.

It accordingly is an object of this invention to provide a data transmission method and apparatus for communicating data with an improved low error rate in the presence of different forms of transmission impairments.

Another object of the invention is to provide a signal structure for high speed data transmission with relatively high immunity to error in the presence of different forms of transmission impairments.

A further object of the invention is to provide such a method and apparatus, and such a signal structure, which is relatively immune to error due to impairments other than phase jitter and additive noise.

It is also an object of the invention to provide a method and apparatus of the above character, and a signal structure of the above character, which can readily be practiced with competitively priced equipment.

Other objects of the invention will in part be obvious and will in part appear hereinafter.

GENERAL DESCRIPTION OF INVENTION

According to this invention, high speed data transmission employs a signal structure resistant to impairment by multiplicative noise, as well as by additive noise. The signal structure also has substantial immunity to phase jitter. Each signal point in the new signal structure has essentially the same low probability of transmission error due to multiplicative noise and to additive noise. In addition, the points have overall minimal electrical power and accordingly are located at minimal distances from the origin of the complex plane representation.

Different forms of transmission impairments have different dependencies on the power of the signal being transmitted and hence on the signal points, i.e., modulation parameter values, of each transmitted pulse. Additive noise, also termed "white noise", is theoretically independent of the signal points. It hence can have the same value for the transmission of any point in a signal structure. Multiplicative noise, on the other hand, is a function of signal power. Hence the power of multiplicative noise for any signal point is directly related to the square of the distance of that signal point from the origin of the complex coordinate plane. This form of noise accordingly varies with the location of a signal point from the origin of the complex plane. Phase jitter is another form of transmission impairment. It causes signal degradation which is related linearly to the distance of a signal point from the coordinate origin.

One feature of the invention is that the signal structure reduces errors due to multiplicative noise and attains relatively good performance relative to additive noise. That is, with this invention one can determine a signal structure that resists degradation by multiplicative noise and which also resists degradation by additive noise to nearly the extent as when the signal space is designed with regard only to additive noise. The invention thus provides a large gain in performance relative to multiplicative noise with only a relatively small loss from the optimum performance otherwise available exclusively for additive noise.

A signal structure is accordingly determined with emphasis on impairment by multiplicative noise as well as by additive noise, and attains an improved overall low error rate.

Another feature of the invention is that a signal structure determined with regard to multiplicative noise and to additive noise in this manner further has a relatively high resistance to degradation due to phase jitter. Thus, designing a signal structure according to the invention to enhance immunity to multiplicative noise impairment appears to enhance immunity to phase jitter impairment to a degree nearly as high as occurs when the design has greater emphasis exclusively on phase jitter impairments.

Further in accordance with the invention, for the case of pure multiplicative noise, the general placement of the signal points in the complex plane representation locates each point centrally within a circular area bounded by decision region and having an area proportional to the square of the distance of that point from the origin of the complex coordinates. This practice provides substantially uniform probability of error due to multiplicative noise for all points in the signal structure. In addition, all the signal points are packed as closely as possible about the coordinate origin without causing their decision regions to overlap. This dense packing is a standard practice to minimize the probability of error for a given signal-to-noise ratio.

A signal structure according to the invention can be viewed, to a first approximation, as having two subsets of points. The points of one subset, located closer to the origin, are in a configuration determined primarily by consideration of additive noise. The points of the other subset, i.e., those further from the origin, are located primarily from consideration of multiplicative noise impairment. In typical practice of the invention where substantial levels of both multiplicative noise and additive noise are present, it is often practical that the inner subset contains the signal points which have a power level below the average power for the entire signal constellation; while those points having a power level above the average power are in the outer subset.

A signal structure determined according to the invention can have symmetrical quadrants, and can be symmetrical in each quadrant about the quadrant bisector, e.g., about the 45° line in quadrant I. This symmetry is not required, but generally facilitates analysis of a transmission system, and facilitates constructing equipment to implement the signal structure.

The signal structure according to the invention is in significant contrast to prior signal structures. For example, the noted U.S. Pat. No. 3,877,768 discloses a signal structure in which the signal points are located in a regular circular array, i.e., the points lie on concentric rings centered on the coordinate origin. Another known signal structure has signal points located in a regular rectangular array with equally spaced rows and columns; the noted U.S. Pat. No. 4,271,527 illustrates this prior configuration in FIG. 5. The same patent shows a variation of that known structure in which outermost points are relocated to a location closer to a coordinate axis.

It further is to be noted that a signal structure according to the invention is of particular significance in reducing errors due to noise in systems having a relatively large number of signal points, generally at least more than eight points. In particular, a sixteen point signal structure according to the invention performs well and is at least competitive if not superior to prior signal structures. However, a signal structure of one or two further degrees of complexity, i.e., having thirty-two points or sixty-four points, and determined according to the invention to account for multiplicative noise, provides superior performance, i.e., lower error rates, than prior signal structures.

Yet another feature of a signal structure according to the invention is that it can have points in addition to those required to define a digital data bit. Additional signal points are known for control purposes. One specific example according to the invention is the provision of synchronizing points in the signal structure. A sixty-four point signal structure according to the invention can additionally have eight such synchronizing points, two in each quadrant, for a total of seventy-two points in the composite structure.

The new signal structure differs from the known regular rectangular array primarily in the outer subset of points. There, points most proximal to either axis are spaced further from that axis than in the conventional rectangular array. Further, points equidistant from both axes are spaced farther outward from the origin in the new signal structure. Other points in the outer subset also are at locations different from those of a rectangular array; the relocation attains a reduction in the density of the points, as contrasted to a conventional rectangular configuration.

These and other features described hereafter regarding the new signal space attain data transmission, on voice-grade telephone lines, which has an improved overall signal-to-noise ratio generally in excess of one decibal (dB), and hence having at least an order of magnitude reduction in error rate.

The invention accordingly comprises the several steps and the relation of one or more of such steps with respect to each of the others, and the apparatus having features of construction, combinations of elements and arrangements of parts which are adapted to affect such steps, all as exemplified in the following detailed disclosure, and the scope of the invention is indicated in the claims.

For a fuller understanding of the nature and objects of the invention, reference should be had to the following detailed description taken in connection with the accompanying drawing, in which.

DESCRIPTION OF ILLUSTRATED EMBODIMENT

Figure 1:
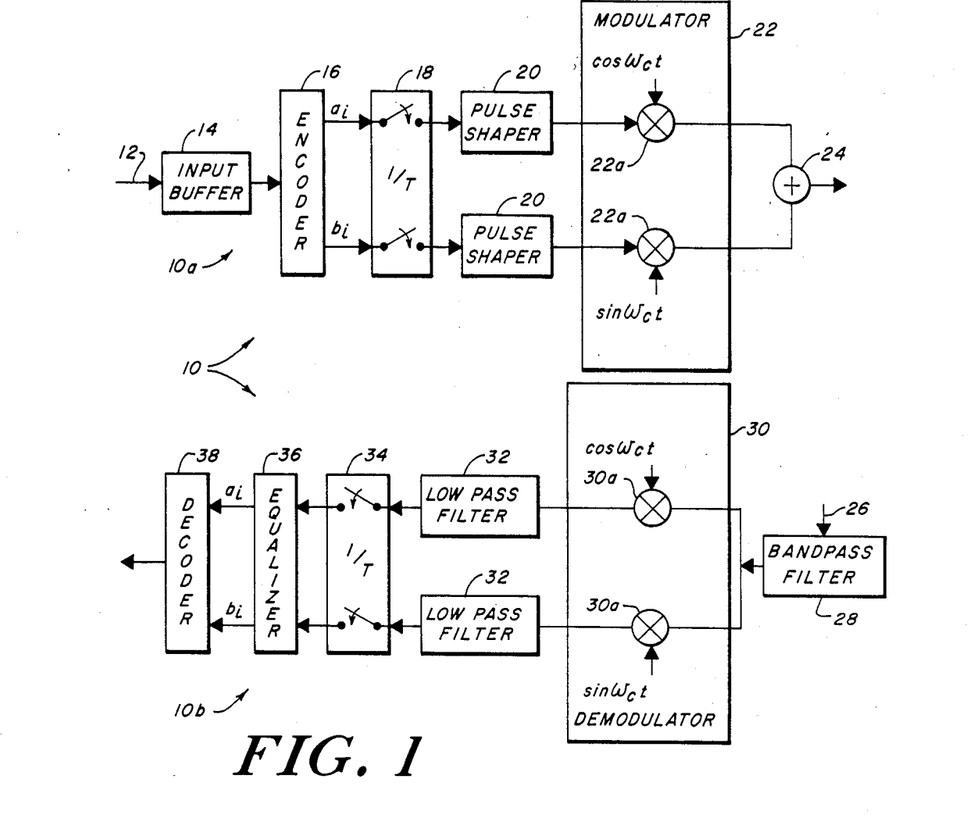
FIG. 1 is a block schematic representation of a modem for use in practice of the invention.

Each transmit/receive terminal in a data transmission system conventionally has a modem i.e., a combined modulator-demodulator. FIG. 1 shows a form of DSB-QC modem with which the invention can be practiced for operation with voice-grade telephone lines and which, as conventional, has a transmit section 10a and a receive section 10b. The transmit section of the illustrated modem 10 receives binary information to be transmitted on an input line 12, and stores it in an input buffer 14. An encoder 16 converts each digital input symbol to two encoded analog signals that define a pair of modulation parameters, designated $a_i$ and $b_i$. These parameters define the one point in the signal structure which identifies the input digital symbol. The encoder 16 may, for example, be implemented with a look-up table.

An electronic switch 18 samples the two encoded signals at the selected baud rate 1/T. A pair of signal shaping circuits 20, 20, each typically a pulse shaping filter network, shapes the analog pulses as required for transmission and applies them to a modulator 22 illustrated as having a pair of oscillators 22a, 22a, to modulate two carrier waveforms. The carrier waveforms, designated (cos wt) and (sin wt), differ in phase by 90°. A summing device 24 combines the two amplitude modulated carrier signals to produce a quadrature amplitude modulated (QAM) output signal, preferably having double side band modulation of each carrier, ready for transmission to another like terminal.

With further reference to FIG. 1, the receive section 10b of the illustrated modem receives on line 26 a quadrature amplitude modulated (QAM) signal and applies it to a bandpass filter 28 that suppresses unwanted frequency components. A demodulator 30, illustrated as having two demodulation stages 30a, 30a that receive (cos wt) and (sin wt) waveforms, shifts the bandpass-filtered signal to two components at a specified base-band. Each signal component is shaped further with a low pass filter 32, and is applied to a sampling switch 34. An equalizer 36 receives the sampled signal components and prepares them for decoding in a decoder 38. The decoder produces the multiple-digit binary symbol which the modulation of the received QAM signal identified.

Figure 2:
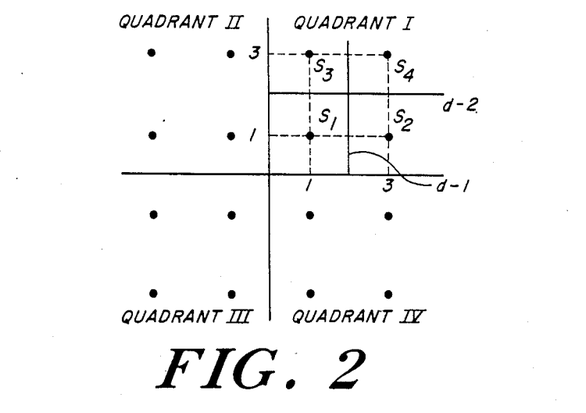
FIG. 2 shows a prior art signal structure.

FIG. 2 shows a conventional prior art signal structure having sixteen points arranged in a regular rectangular array with four points in each of four identical quadrants of a complex plane. The quadrants are designated with Roman numerals, and the points in each quadrant are designated with the letter(s) and an Arabic number. The coordinates of the points are also designated, in this instance, with numerals along each coordinate axis. The decision lines for distinguishing each signal point in quadrant I from another point are the coordinate axes and the solid lines d-1 and d-2. Each point in this rectangular pattern is located at the center of a square decision region bounded by decision lines.

The encoder 16 in the FIG. 1 modem 10, when operating with this signal pattern, produces modulation parameters that convert each four-bit digital input symbol to one of the sixteen points of FIG. 2. Conversely, the receiver decoder 38 converts the pair of modulation parameters of a received signal to the corresponding four-digit symbol according to this pattern.

The probability of error which can arise in a data transmission system operating with the signal structure of FIG. 2 is different if only additive noise is considered, as contrasted to considering both additive and multiplicative noise. This is apparent from a comparison of Equations (1) and (2) below. The probability of error for each signal point in the FIG. 2 structure is inversely proportional to the signal-to-noise ratio at that point. The signal-to-noise ratio for any particular point (i), where (i) is an integer, due to additive noise alone (SANR) is expressed in Equation (1), whereas Equation (2) presents the noise ratio (SNR) for the point (i) due to both additive and multiplicative noise.

$$SANR_i = d_i^2/A \tag{1}$$

$$SNR_i = \frac{d_i^2}{A + 4B|s_i|^2/\sum_{j=1}^{4}|s_j|^2} \tag{2}$$

where $d_i$ is the distance of a point from the decision line, $|s_i|$ is the distance from a point in the signal structure to the origin, where the subscript (i) identifies the point and has the value 1, 2, 3 or 4, A is the variance of the additive noise, and B is the variance of the multiplicative noise.

Equation 2 indicates that the signal-to-noise ratio decreases, and correspondingly the probability of error increases, at points located at greater distances from the origin. Further, this increase in the probability of error grows with increasing multiplicative noise.

This invention provides signal structures that take the multiplicative noise into account. The signal structures maximize the signal-to-noise ratio, and hence minimize the probability of error, in the presence of multiplicative noise as well as other impairments such as additive noise.

To this end, the present invention provides a data transmission modem that operates with a signal structure in which the signal-to-noise ratio corresponding to Equation 2 is essentially constant for all points in the signal constellation, and has an overall minimal level, within the practical constraints of the implementing hardware.

Figures 3, 5:
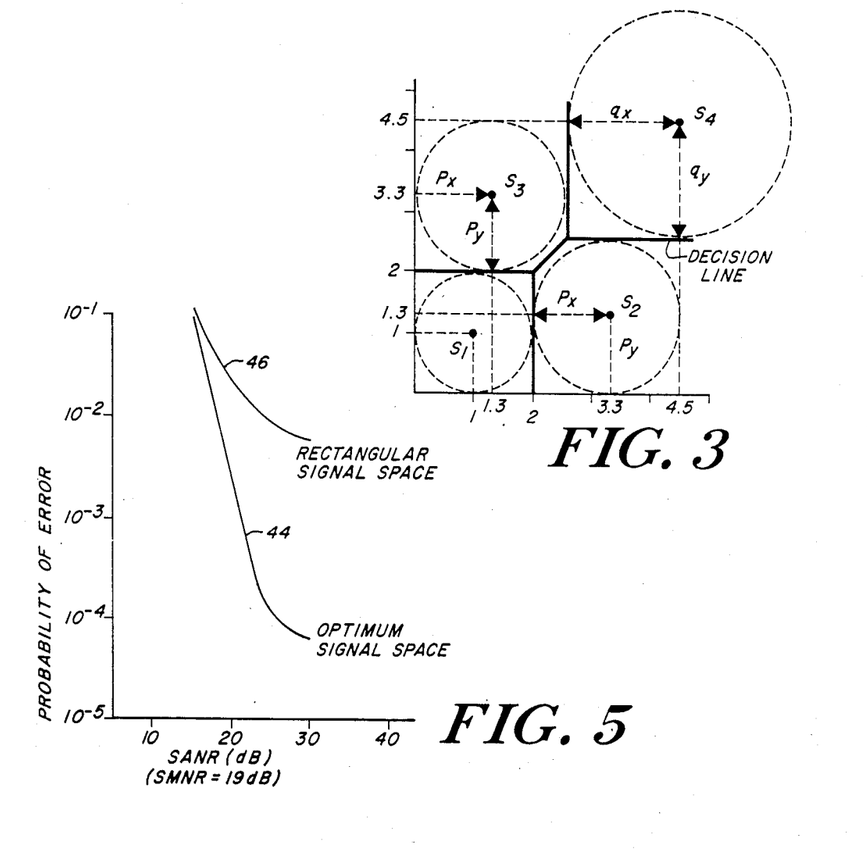
FIG. 3 shows one quadrant of a sixteen-point signal structure according to the invention.
FIG. 5 is a graph showing changes in the probability of error for different values of the ratio of signal to additive noise for a selected value of the ratio of signal to multiplicative noise.

FIG. 3 shows one of four identical quadrants of a sixteen-point signal configuration determined according to the invention for a signal-to-additive noise ratio (SANR) of 20 dB and a signal-to-multiplicative noise ratio (SMNR) of 19 dB. The drawing also shows the decision line distances (p) and (q) used in determining the locations of the points in this constellation as now described.

The signal-to-noise ratio of each point in the configuration of FIG. 3 is given by equations 3, 4 and 5, assuming that for each point the horizontal and vertical decision line distance are equal, i.e., with reference to FIG. 3, that $(p_x = p_y)$ and $(q_x = q_y)$. This assumption simplifies the explanation, and is not a limitation on the invention.

$$SNR_1 = \frac{1}{A + 2B'} \tag{3}$$

$$SNR_2 = SNR_3 = \frac{p^2}{A + B'[(p+2)^2 + p^2]} \tag{4}$$

$$SNR_4 = \frac{q^2}{A + 2B'(q+2p)^2} \tag{5}$$

where $$B' = \frac{4B}{2 + 2(p+2)^2 + 2p^2 + 2(q+2p)^2} \tag{6}$$

The signal structure of this invention provides a uniform probability of error for all points and hence solves the above equations for (p) and (q) with any given noise parameters A and B such that $$SNR_i = SNR_j; \quad i,j = 1, 2, 3, 4 \tag{7}$$

The direct solution of the above equations involves two sets of fourth order equations with two unknowns. One numerical method of solution provides as follows, assuming the term B' of Equation (6) as a parameter and imposing an overall minimal spacing of the points from the coordinate origin, i.e., for a minimal value of ($d_i$) in Equations (2) and (3).

Combining Equations (3) and (4) according to this solution yields:

$$Ap^2 - 4B' p - A - 4B' = 0 \tag{8}$$

$$p = \frac{2B' \pm \sqrt{4B'^2 + A^2 + 4AB'}}{A} \tag{9}$$

Further, combining Equations (3) and (5) provides:

$$Aq^2 - 8B' pq - 8B'p^2 - A = 0 \tag{10}$$

$$q = \frac{4B'p \pm \sqrt{16B'^2 p^2 + 8AB'p^2 + A^2}}{A} \tag{11}$$

Equations (9) and (11) provide a basis for determining the desired sixteen-point signal structure for any given noise parameters A and B. For example, assuming no multiplicative noise is present, i.e., B=0, Equations (9) and (11) reduce to p=q=1. This is the conventional rectangular signal constellation.

On the other hand, in the theoretical limiting condition having pure multiplicative noise, i.e., with A=0, each of (p) and (q) approach infinity as the optimum solution, if point S1 is fixed at the coordinates (1, 1). If, however, the outer corner point S4 is fixed, it can be shown that the innermost point S1 is shifted to the origin of the coordinate axis.

FIG. 3 also shows that each signal point determined in the foregoing manner can be viewed as centrally located within a generally circular region bounded by decision lines. The approximate radius of the illustrated regions are: unity for the point S1, (p) for S2 and for S3, and (q) for S4. Each radius is proportional, at least to a first approximation, to the distance of the corresponding signal point from the origin.

Figure 4:
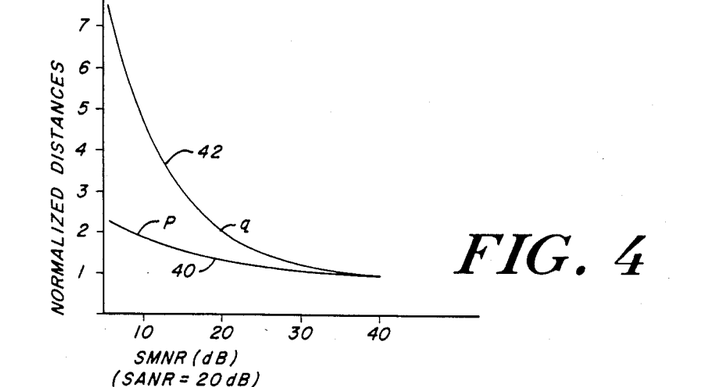
FIG. 4 is a graph showing changes in signal space parameters according to the invention for different values of the ratio of signal to multiplicative noise.

The graph of FIG. 4 shows with curves 40 and 42 how the values of the constellation parameters (p) and (q) change for different values of signal-to-multiplicative noise for a given signal-to-additive noise ratio of 20 dB. Note that (q), and to a lesser extent (p), begin to increase rapidly as the multiplicative noise decreases.

FIG. 5 plots with curves 44 and 46 the probability of data transmission error at a fixed value of multiplicative noise i.e., SMNR=19 dB, for both an optimum signal space according to the invention and for a prior art rectangular signal space, respectively. Note that the configuration of this invention provides a significantly lessor probability of error, and that the improvement increases rapidly with decreasing additive noise i.e., where the multiplicative noise becomes increasingly predominant.

Referring again to FIG. 3, the particular coordinates shown, i.e., p=1.3 and q=1.9 are for a SMNR of 19dB and SNAR of 20 dB. This signal pattern of FIG. 3 is deemed preferable for commercial practice of the invention in a so-called 9600 bps transmission system subject to these levels of noise impairment.

Figure 6:
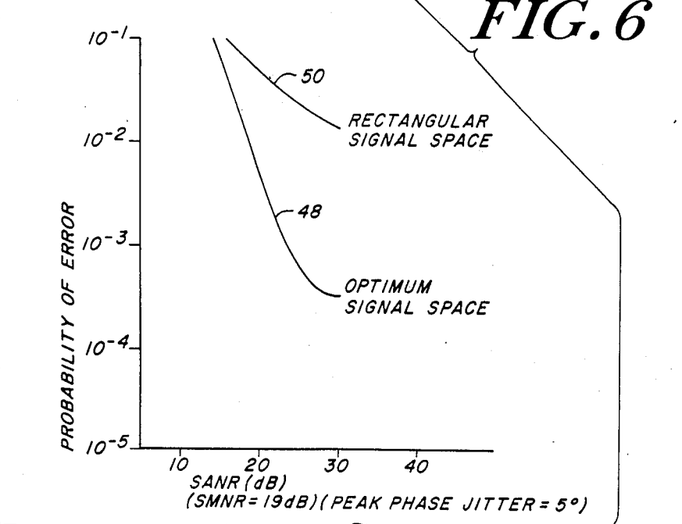
FIG. 6 is a graph showing changes in the probability of error for different signal structures in further illustration of the invention.

An additional finding of the present invention is that a signal structure designed in the foregoing manner operates with a high degree of reliability even in the presence of phase jitter, which is another form of electrical noise. This is apparent from FIG. 6, which shows with curve 48 the probability of transmission error for a signal structure determined in the foregoing manner and, with curve 50, for the conventional regular rectangular signal structure. The graph shows probability of error as a function of the signal-to-additive noise ratio, with the signal-to-multiplicative noise ratio 19 dB and for a value of peak phase jitter of 5°, without any form of carrier tracking. It is noteworthy that the curves of FIG. 6 appear similar in individual shape and in differential character to those shown in FIG. 5.

Figure 7:
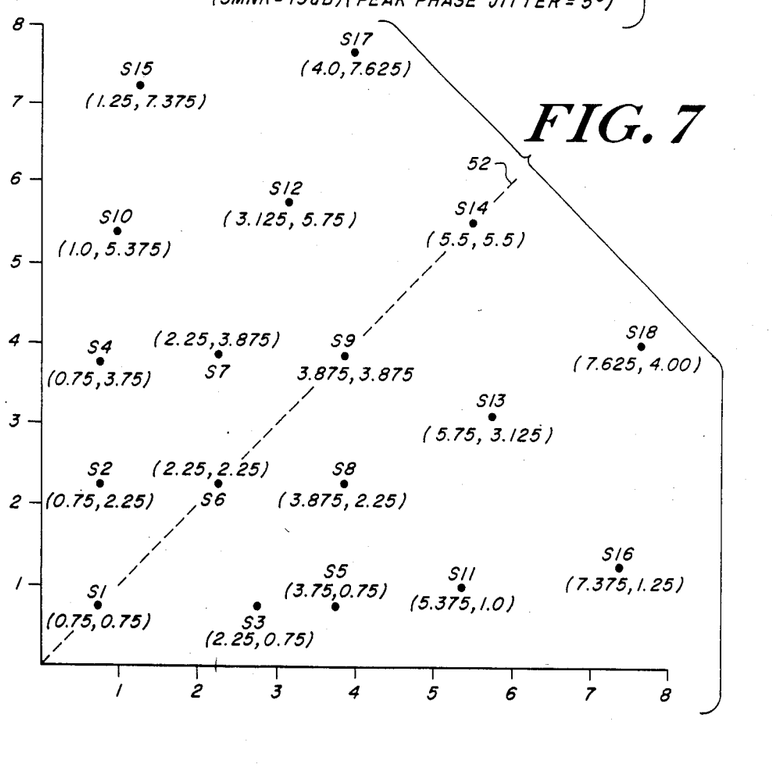
FIG. 7 one quadrant of a sixty-four point signal structure according to the invention and further having two synchronizing points in each quadrant.

The foregoing procedure for determining a sixteen-point signal structure which accounts for both multiplicative noise and additive noise can be applied to signal structures having other numbers of points, and typically having greater numbers of points. The number of variables in the equations increases and the solutions become more time consuming. Conventional methods of solution can be implemented, preferably using computer-based techniques. FIG. 7 illustrates this further practice of the invention by showing a signal structure which a modem encoder and decoder can provide for a 14,400 bit per second transmission system operating at a 2400 symbol per second rate. The structure, which shows the coordinate of each point to the origin, is designed for SMNR of 28 dB and SANR of 30 dB. This signal structure has sixty-four points arranged with sixteen points in each of four symmetrical quadrants, of which FIG. 7 shows quadrant I. There are also two additional points per quadrant, designated S17 and S18 in FIG. 7, and hence a total of eight additional points, for synchronizing purposes.

Note that the subset of inner points S1-S9 is arranged substantially in a regular rectangular pattern, whereas the remaining outer subset of points differs from a rectangular pattern and is less densely packed in the manner described above. In particular, the points of the outer subset are spaced further from either axis than are the points in the inner subset, as well as being spaced further apart from one another.

A modem 10 as shown in FIG. 1 can be constructed with known electronic skills to operate with signal structures according to the invention. In particular, the modem encoder 16 can be constructed to encode binary symbols to signal points according to a signal structure as described and as embodied, for example, in FIG. 3 and in FIG. 7. Correspondingly, the modem decoder 38 can provide the reverse operation. The following articles are exemplary of teaching in the art of modem constructions as represented in FIG. 1 and of implementations of them:

P. J. Van Gerwen et al., "Microprocessor Implementation of High-Speed Data Modems," *IEEE Transactions On Communications*, Vol. COM-25, No. 2, February 1977, pp. 238–250.

M. Koya et al., "High Speed Data Modem Using Digital Signal Processor," *IEEE, International Communication Conference*, 1981, pp. 14.7.1–14.7.6.

It will thus be seen that the objects set forth above, including those made apparent from the preceding description, are efficiently attained. Since certain changes may be made in carrying out the above method of digital data transmission and of optimizing a signal structure for multiplicative noise, among other noise forms, and in the modem construction set forth without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described the invention, what is claimed as new and secured by Letters Patent is:

1. A method for determining a quadrature amplitude-modulated data transmission signal structure that has a complex plane representation having plural points in each quadrant and having in each quadrant points located at at least two different distances from the origin, said method having the improvement comprising the steps of
   A. selecting the signal points to identify signals that can be received with substantially uniform low probability of error due to multiplicative noise, said selecting step including
      (1) determining a representation of the ratio of signal strength to electrical noise, including multiplicative noise, for each signal point in said complex plane representation of said structure, and
      (2) locating each signal point in that complex plane at a position at which the value of said ratio for the signal identified by that point is substantially the same as the value of that ratio for all other signals in the structure, and
   B. selecting receiver decision regions for such signal points with a single point located substantially centrally in each such region.

2. A method according to claim 1 which said locating step includes the step of valuing said ratio, for each signal point, for a single selected set of noise parameters including a single level of multiplicative noise.

3. A method for determining a quadrature amplitude-modulated data transmission signal structure that has a complex plane representation having plural points in each quadrant and having in each quadrant points located at at least two different distances from the origin, said method having the improvement comprising the steps of
   A. selecting the signal points to identify signals that can be received with substantially uniform low probability of error due to multiplicative noise, said selecting step comprising
      (1) determining a representation of the ratio of signal strength to electrical noise, including multiplicative noise and additive noise, for each signal of said structure, and
      (2) locating each signal point in a complex plane representation of that structure at a position at which the value of said ratio for the signal identified by that point is substantially the same as the value of said ratio for all other signals in said structure, where said ratio for each signal is valued with the same selected combination of multiplicative noise and additive noise, and
   B. selecting receiver decision regions for such signal points with a single point located substantially centrally in such region.

4. A method according to claim 3 in which said locating step further includes selecting the locations of said signal points in the complex plane to have overall, for said structure, minimal spacing from the coordinate origin.

5. A method of determining a double side band-quadrature carrier modulation signal structure having a two-coordinate complex plane representation that has more than eight points, said method having the improvement comprising the steps of
   A. arranging a first subset of said points in a substantially regularly-spaced pattern centered at the origin of said complex plan representation of said structure, with substantially uniform low probability of error primarily for additive noise, and
   B. arranging a second subset of said points, consisting of the remainder of the points, outward from said first subset at locations further spaced apart than corresponding locations of said regularly-spaced pattern and with points thereof closest to the coordinate axes being further removed from such axes than corresponding locations in said regularly-spaced pattern and further arranging said points of said second subset with substantially uniform low probability of error, including for multiplicative noise, so that the receiver decision for data transmitted with said signal structure can account for multiplicative noise.

6. A method for transmitting on voice-grade telephone lines each of a set of M binary data digits encoded in one of $2^M$ values of a double side band-quadrature carrier modulated signal, where M is a positive integer of at least three, said method the improvement comprising the step of providing each said signal to have substantially equal probability of transmission error due to a selected non-zero and finte level of multiplicative noise and a selected non-zero and finite level of additive noise, and providing a structure of M said signals with minimal overall probability of said transmission error, and including transmitting different ones of said signals with one of at least two different power levels, and selecting a receiver decision region for each signal transmitted with said encoding with a size that is an increasing function of the power level of the signal, whereby the detection of data transmitted with said encoding can account for multiplicative noise and additive noise.

7. A method for the transmission of digital data by double sideband-quadrature carrier modulation by selecting one of a structure $2^M$ signals, where M is an integer of at least three, wherein each of said signals corresponds to one of M points in a graphical two-coordinate complex plane representation, said method having the improvement comprising the step of locating said points equally in four symmetrical quadrants of said plane with all points therein being located to identify signals that have substantially equal, and overall minimal, probability of transmission error due to a selected level of multiplicative noise and a selected level of additive noise, and including locating said points at one of at least two different distances from the origin of said representation, with a larger of said distances being more than twice a smaller of said distances, and selecting receiver decision regions for such signal points with a single point located centrally in each such region and with the size of the region increasing with distance of the point therein from the origin of said representation.

8. A method according to claim 7 in which M equals four and in which said locating step includes locating said points in one quadrant substantially at the coordinates having the following relative values along the horizontal and vertical axes of said representation, respectively: 1,1; 1.3, 3,3; 3.3, 1.3; and 4.5, 4.5.

9. A method according to claim 7 in which M equals six and in which locating step includes locating said points in one quadrant which are designated S1, S2 . . . S16, substantially at the coordinates having the following relative values along the horizontal and vertical axes of said representation respectively:

S1: 0.75; 0.75.
S2: 0.75; 2.25.
S3: 2.25; 0.75.
S4: 0.75; 3.75.
S5: 3.75; 0.75.
S6: 2.25; 2.25.
S7: 2.25; 3.875.
S8: 3.875; 2.25.
S9: 3.875; 3.875.
S10: 1.0; 5.375.
S11: 5.375; 1.0.
S12: 3.125; 5.75.
S13: 5.75; 3.125.
S14: 5.5; 5.5
S15: 1.25; 7.375.
S16: 7.375; 1.25.

10. Modem apparatus for data transmission and having a transmission encoder and a receiving decoder, said apparatus having the improvement wherein said encoder includes means for converting each of a set of M binary data digits to one of $2^M$ values of a quadrature amplitude-modulated signal, where M is a positive integer of at least three, and for providing each said signal to have substantially equal probability of transmission error due to a selected non-zero and finite level of multiplicative noise and a selected non-zero and finite level of additive noise and for providing said signals with one of at least two different power levels, and further for providing a structure of M said signals with minimal overall probability of said transmission error, and wherein said decoder includes means for converting each of said $2^M$ values of a quadrature amplitude-modulated signal to one of a set of M binary digits, so that detection of data transmitted with said encoding can account for multiplicative noise and additive noise.

11. A method for determining a data transmission signal structure that has a complex plane representation having plural points in each quadrant and having in each quadrant at least two points located at different distances from the origin of said representation, said method having the improvement comprising the step of selecting the signals to have substantially uniform low probability of error due to multiplicative noise, said selecting step including selecting the location of each signal point, in said complex plane representation of said structure, centrally within a substantially circular region free of overlap with other said regions of said structure and with an area proportionally related to the square of the distance of that signal point from the coordinate origin of said complex plane.

* * * * *

UNITED STATES PATENT AND TRADEMARK OFFICE
CERTIFICATE OF CORRECTION

PATENT NO. : 4,660,213
DATED : April 21, 1987
INVENTOR(S) : Jerry L. Holsinger et al.

It is certified that error appears in the above-identified patent and that said Letters Patent is hereby corrected as shown below:

At Column 10, line 4, delete "3", and insert --1--.

At Column 10, line 36, before "the", insert --having--.

At Column 10, line 39, delete "finte", and insert --finite--.

At Column 11, line 8, after "1.3," delete "3,3", and insert --3.3--.

At Column 11, line 10, after "locating", insert --said--.

Signed and Sealed this

Seventh Day of June, 1988

Attest:

DONALD J. QUIGG

*Attesting Officer*    *Commissioner of Patents and Trademarks*